United States Patent
Lin

(10) Patent No.: US 7,336,676 B2
(45) Date of Patent: Feb. 26, 2008

(54) MULTI-QUEUE SINGLE-FIFO ARCHITECTURE FOR QUALITY OF SERVICE ORIENTED SYSTEMS

(75) Inventor: Chu-Ming Lin, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 828 days.

(21) Appl. No.: 10/760,654

(22) Filed: Jan. 20, 2004

(65) Prior Publication Data
US 2005/0157709 A1 Jul. 21, 2005

(51) Int. Cl.
*H04L 12/28* (2006.01)
(52) U.S. Cl. .................... 370/412; 709/250
(58) Field of Classification Search .................. None
See application file for complete search history.

(56) References Cited
U.S. PATENT DOCUMENTS 6,044,225 A * 3/2000 Spencer et al. ............ 710/52
6,947,438 B1 * 9/2005 Chang et al. .............. 370/419
7,124,205 B2 * 10/2006 Craft et al. ................ 709/250
2002/0061012 A1 * 5/2002 Thi et al. ................... 370/352
2002/0150106 A1 * 10/2002 Kagan et al. ............ 370/395.6

* cited by examiner

*Primary Examiner*—Phirin Sam
(74) *Attorney, Agent, or Firm*—Thomas, Kayden, Horstemeyer & Risley

(57) ABSTRACT

A multi-queue single-FIFO scheme for quality of service oriented communication. According to the invention, an arbiter maintains a number of next access pointers for multiple queues storing data packets to be transmitted. The arbiter also determines which queue is to be serviced next contingent upon a quality of service policy and then fetches at least one data packet, identified by the chosen queue's next access pointer, through a peripheral bus by means of direct memory access (DMA). A single FIFO buffer is connected to the arbiter to store and manage the fetched data packet in a first-in-first-out manner. Following the FIFO buffer, physical layer interface logic accepts each data packet, if available, and prepares the data packet for transmission on a physical medium.

4 Claims, 3 Drawing Sheets

MULTI-QUEUE SINGLE-FIFO ARCHITECTURE FOR QUALITY OF SERVICE ORIENTED SYSTEMS

BACKGROUND OF THE INVENTION

1. Field of the Invention

The invention relates to communication systems, and more particularly to a multi-queue single-FIFO scheme for quality of service (QoS) oriented systems.

2. Description of the Related Art

With the convergence of communication and computing technology, processing platforms have been integrated with communication systems to provide enhanced service features and resource allocation. Such a processing platform is typically coupled to a communication network and hosts several processes for transmitting data to or receiving data from nodes on the communication network. A processing platform may be configured to allocate resources to provide a quality of service (QoS) for particular communication service supported by the processing platform.

A processing platform integrated as part of a communication system may include a peripheral device coupled to a communication medium and a host system to receive data from the peripheral device and transmit data to the communication medium through the peripheral device. A peripheral bus typically transfers data between the host system and the peripheral device. The processing platform that supports QoS and resource allocation typically uses multiple queues in which each queue is associated with a particular QoS requirement and/or a particular data flow. These queues should be effectively processed per their respective priorities, for example, to permit many data flows to be individually scheduled per their respective negotiated QoS levels.

As far as is known, most conventional peripheral devices carry out QoS guarantees over multiple first-in-first-out (FIFO) buffers, i.e., they employ many FIFO buffers to service multiple queues. The FIFO buffer is usually implemented with registers or memory units that occupy the majority of an IC (integrated circuit) chip area. Therefore, the geometry of an IC chip increases as it includes more FIFO buffers. Unfortunately, the larger the chip size, the more costs and power consumption are incurred. Accordingly, there is a need to address such problems of the related art. It would be desirable to provide a multi-queue system with reduced number of FIFO buffers, thereby accomplishing overall system cost effectiveness.

SUMMARY OF THE INVENTION

The present invention is generally directed to multi-queue single-FIFO architecture for quality of service oriented systems. According to one aspect of the invention, a multi-queue network apparatus for quality of service oriented communication is disclosed. The apparatus of the invention comprises a host system and a peripheral module. The host system comprises a system memory and a peripheral bus. The system memory has multiple queues each of which is configured to store data packets to be transmitted. The peripheral module includes an arbiter, a FIFO buffer, and physical layer interface logic. The arbiter, adapted to interface with the peripheral bus, maintains a number of next access pointers targeting each queue within the system memory, respectively, determines which queue is to be serviced next contingent upon a quality of service policy, and fetches at least one data packet identified by the chosen queue's next access pointer. The FIFO buffer is connected between the arbiter and the physical layer interface logic; it is capable of storing and managing the fetched data packet in a first-in-first-out manner. The physical layer interface logic accepts each data packet from the FIFO buffer and prepares the packet for transmission on a physical medium.

According to another aspect of the invention, a multi-queue network apparatus is made up of a host system and a peripheral module. The host system comprises a system memory and a peripheral bus. The system memory has multiple queues each of which is configured to store data packets to be transmitted. The peripheral module includes an arbiter, a data path controller, and two FIFO buffers. The arbiter, adapted to interface with the peripheral bus, maintains a number of next access pointers targeting each queue within the system memory, respectively, determines which queue is to be serviced next contingent upon a quality of service policy, and fetches at least one data packet identified by the chosen queue's next access pointer. The data path controller is connected to the arbiter and accepts therefrom the fetched data packet. The two FIFO buffers, connected in parallel to the data path controller, are responsible for storing and managing the fetched data packet in a first-in-first-out manner. Furthermore, the data path controller allows one of the FIFO buffers to be filled with the fetched data packet while the other FIFO buffer is engaged in outgoing transference.

According to yet another aspect of the invention, an apparatus for servicing multiple queues in a host system using reduced number of FIFO buffers is provided. The apparatus of the invention includes an arbiter, a FIFO buffer, and physical layer interface logic. The arbiter maintains a number of next access pointers for the multiple queues storing data packets to be transmitted. Additionally, the arbiter is able to determine which queue is to be serviced next contingent upon a quality of service policy and fetch at least one data packet, identified by the chosen queue's next access pointer, through a peripheral bus by means of direct memory access. The FIFO buffer is connected between the arbiter and the physical layer interface logic; it is used to store and manage the fetched data packet in a first-in-first-out manner. The physical layer interface logic accepts each data packet from the FIFO buffer and prepares the packet for transmission on a physical medium.

DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

Reference throughout this specification to "one embodiment" or "an embodiment" indicates that a particular feature, structure, or characteristic described in connection with the embodiments is included in at least one embodiment of the present invention. Thus, the appearances of the phrase "in one embodiment" or "an embodiment" in various places throughout this specification are not necessary all referring to the same embodiment. Furthermore, the particular features, structures, or characteristics may be combined in one or more embodiments. As to the accompanying drawings, it should be appreciated that not all components necessary for a complete implementation of a practical system are illustrated or described in detail. Rather, only those components necessary for a thorough understanding of the invention are illustrated and described. Furthermore, components which are either conventional or may be readily designed and fabricated in accordance with the teachings provided herein are not described in detail.

Figure 1:
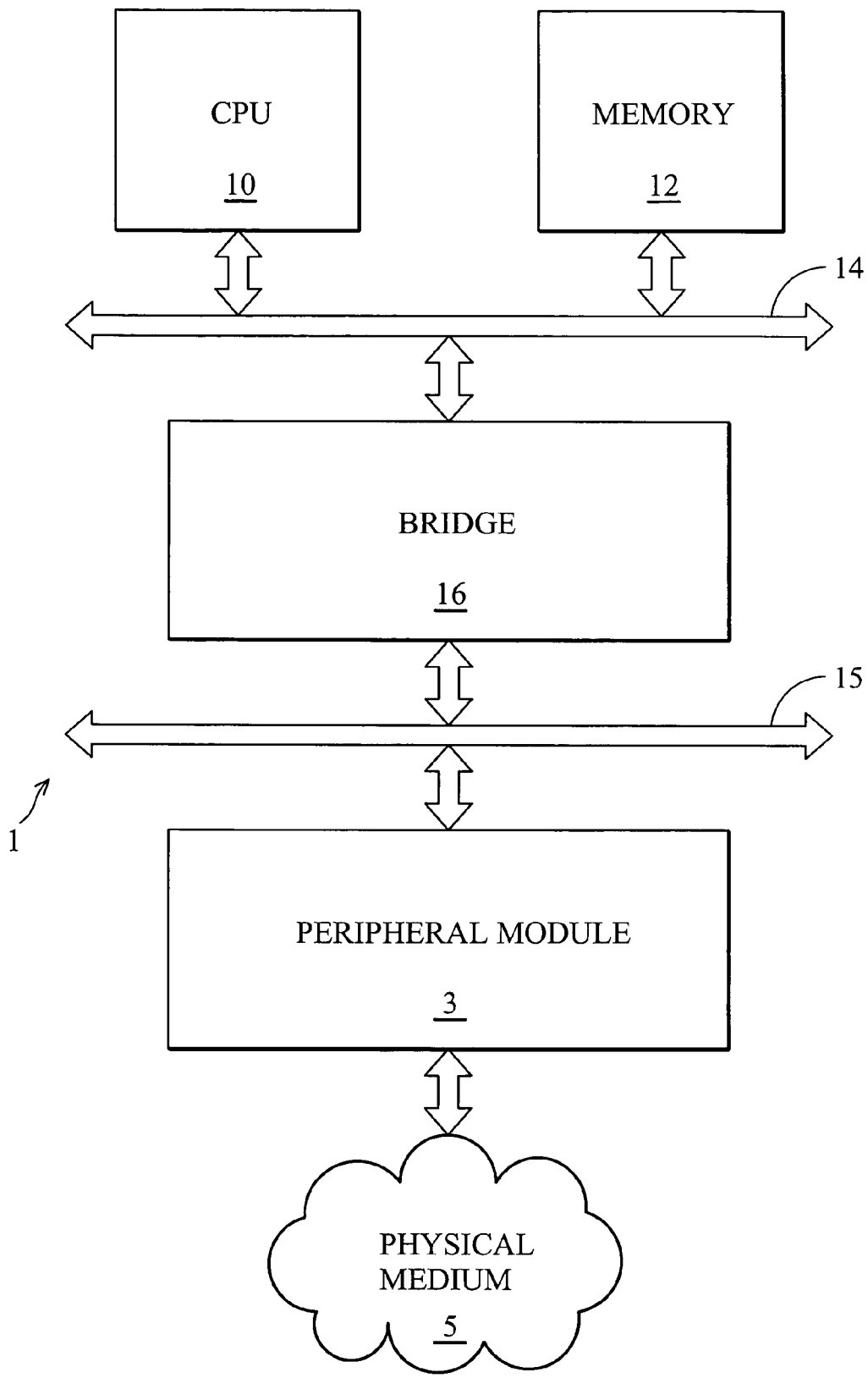
FIG. 1 is block diagram of a QoS oriented system for transferring data to or from a physical medium according to an embodiment of the invention.

FIG. 1 is a block diagram of a QoS oriented system for transferring data to or from a physical medium 5 according to an embodiment of the invention. A host system 1 comprises a central processing unit (CPU) 10 and system memory 12 coupled by a system bus 14; it may host application processes. The system memory 12 may be any combination of random access memory (RAM) or non-volatile memory devices (e.g. hard disk or flash memory). However, this is merely an example of a host system and embodiments of the present invention are not limited in this respect. A peripheral module 3 is coupled to communicate with the physical medium 5. The physical medium 5 may be any one of several media suitable for data transmission according to a communication protocol, including, for example, coaxial cabling, twisted pair lines, optical fiber cabling, or a wireless medium. The peripheral module 3 is coupled to the system bus 14 through a peripheral bus 18 and bridge 16. The term "bridge" refers to a device that connects multiple buses together. The peripheral bus 18 may be a peripheral component interconnect (PCI) bus or universal serial bus (USB). These are merely examples of the bus 18 and embodiments of the present invention are not limited in this respect. According to an embodiment, processes hosted on the CPU 10 and memory 12 may forward data to the peripheral module 3 to be transmitted through the physical medium 5. Similarly, the peripheral module 3 may receive data from the physical medium 5 to be transmitted to the CPU 10 and memory 12 as input to processes hosted thereon.

Figure 2:
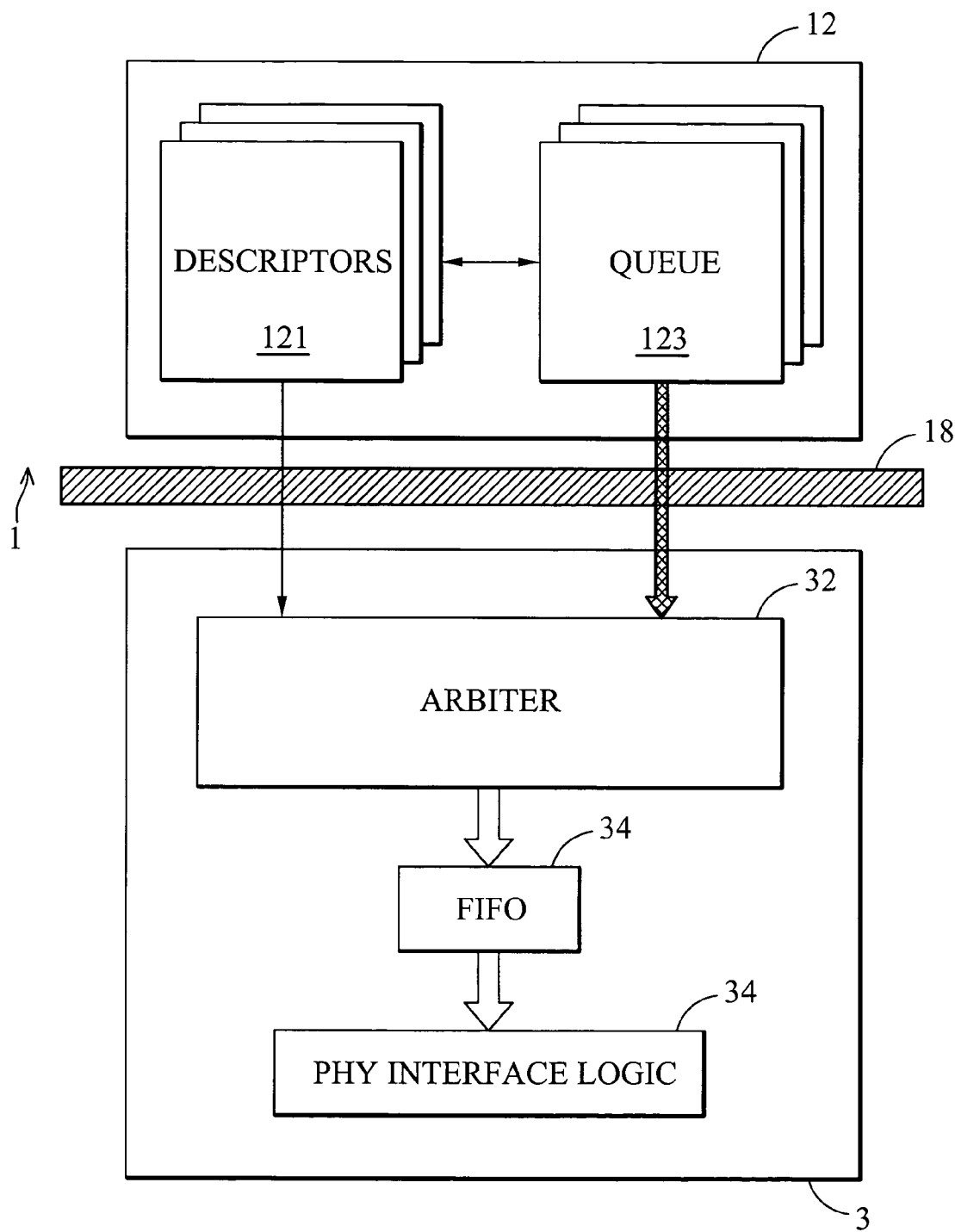
FIG. 2 is a block diagram of a peripheral module transferring data packets from a host system with multiple queues according to an embodiment of the invention.

FIG. 2 is a block diagram of the peripheral module 3 transferring data packets from the host system 1 with multiple queues according to an embodiment of the invention. Throughout the description of the present invention, the term "data packet" shall be understood to include any grouping of one or more data elements of any size, including data cells, data bytes, and the like. The host system 1 and the peripheral module 3 may communicate with each other through the PCI bus 18 for example. The PCI bus 18 may transfer data between the system memory 12 and the peripheral module 3 using a "direct memory access (DMA)" through which data can be transferred in the bus independent of one or more processes hosted on the host system 1. For example, the peripheral module 3 may act as a bus master to initiate PCI bus transactions to store or retrieve data in the memory 12 at the host system 1. However, this is merely an example of how a host system and peripheral module may communicate and embodiments of the present invention are not limited in this respect. A portion of the host system's resources, such as the system memory 12, are allocated to multiple queues within the system. In one embodiment, the memory 12 includes a number of queues 123, each of which is configured to store data packets to be transmitted. The host system 1 maintains several lists of descriptors 121 targeting each queue within the system memory 12, respectively. Each list of descriptors comprises access information for the data packets stored in an associated queue. Each descriptor is responsible for identifying one data packet. A descriptor as referred to herein relates to a data structure including the location of a data packet within the system memory 12. However, this is merely an example of a descriptor and embodiments of the present invention are not limited in this respect.

With continued reference to FIG. 2, the peripheral module 3 includes an arbiter 32, a FIFO buffer 34, and physical layer interface logic 36. The arbiter 32 is adapted to interface with the peripheral bus 18. According to the invention, the arbiter 32 maintains several next access pointers targeting each queue within the system memory 12, respectively, and determines which queue is to be serviced next contingent upon a QoS policy. In one embodiment, each next access pointer points to the descriptor subsequent to a previous descriptor within a list of descriptors for a queue, in which the previous descriptor identifies the data packet that has just been fetched from the queue. Once the arbiter 32 determines a suitable queue, it fetches at least one data packet identified by the chosen queue's next access pointer. Flows of access information and data packets are herein indicated by a thin and thick line, respectively. The next access pointers may be initialized by the host system 1 and then advanced upon access to one of the descriptor lists 121 for locating a queue 123. The peripheral module 3 can thus select a descriptor to locate a memory location storing a subsequent data packet to be transmitted and initiate DMA transfers to fetch the data packet in accordance with the QoS policy. The FIFO buffer 34 is connected between the arbiter 32 and the physical layer interface logic 34 for storing and managing the data packets from the arbiter 32 in a first-in-first-out manner. Then the physical layer interface logic 36 accepts each data packet from the FIFO buffer 34 and prepares the packet for transmission on the physical medium 5. The arbiter, FIFO buffer and physical layer interface logic may be implemented with any combination of logic in an application specific integrated circuit (ASIC) or firmware. Therefore, the single FIFO architecture of the invention in effect reduces the chip size and power consumption for the peripheral module 3.

Figure 3:
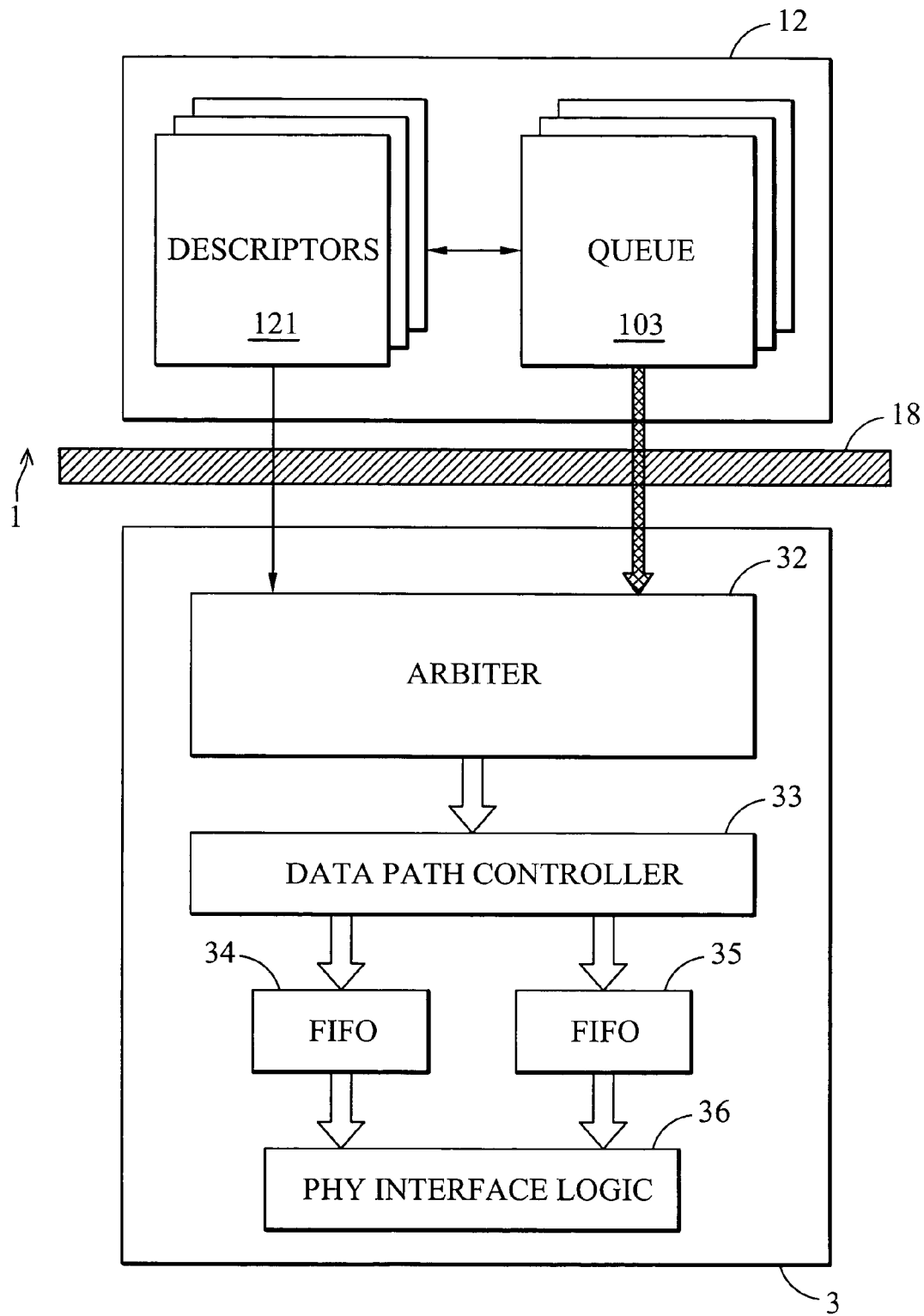
FIG. 3 is a block diagram of a peripheral module transferring data packets from a host system with multiple queues according to an alternative embodiment of the invention.

With reference to FIG. 3, an alternative embodiment is illustrated. The embodiment of FIG. 3 is similar to that of FIG. 2 except the use of double-buffering scheme. In this embodiment, the peripheral module 3 further includes a data path controller 33 and another FIFO buffer 35 in addition to the arbiter 32, the FIFO buffer 34 and the physical layer interface logic 36. The data path controller 33 is connected to the arbiter 32 and accepts one or more fetched data packets from a chosen queue within the system memory 12. The two FIFO buffers 34 and 35, connected in parallel to the data path controller 33, are responsible for storing and managing the fetched data packet in a first-in-first-out manner. The data path controller 33 allows one of the FIFO buffers to be filled in with the fetched data packet while the other FIFO buffer is being engaged in outgoing transference. This results in improved throughput. The FIFO buffers 34 and 35 on the other side are also connected in parallel to the physical layer interface logic 36 that prepares the data packet for transmission on the physical medium 5. Therefore, reduction in the number of FIFO buffers increases overall system cost effectiveness.

In view of the above, the present invention discloses multi-queue single-FIFO architecture for QoS-based systems. More particularly, the present invention provides a solution to cut size, cost, and power consumption while supporting QoS over multiple queues.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A multi-queue network apparatus for quality of service oriented communication, comprising: a host system comprising a system memory and a peripheral bus, the system memory including a plurality of queues each of which is configured to store data packets to be transmitted; and a peripheral module comprising: an arbiter, adapted to interface with the peripheral bus, maintaining a plurality of next access pointers targeting each queue within the system memory, respectively, determining which queue is to be serviced next contingent upon a quality of service policy, and fetching at least one data packet identified by the chosen queue's next access pointer; a data path controller, connected to the arbiter, accepting therefrom the fetched data packet; and two FIFO buffers, connected in parallel to the data path controller, storing and managing the fetched data packet in a first-in-first-out manner; wherein the data path controller allows one of the FIFO buffers to be filled with the fetched data packet while the other FIFO buffer is engaged in outgoing transference.

2. The multi-queue network apparatus of claim 1 wherein the host system maintains a plurality of lists of descriptors targeting each queues within the system memory, respectively, each list of descriptors includes access information for the data packets stored in an associated queue, and each descriptor is responsible for identifying one data packet.

3. The multi-queue network apparatus of claim 2 wherein each next access pointer points to the descriptor subsequent to a previous descriptor within a list of descriptors for a queue, in which the previous descriptor identifies the data packet most recently fetched from the queue.

4. The multi-queue network apparatus of claim 1 wherein the peripheral module further comprises physical layer interface logic, connected to the two FIFO buffers, to prepare the data packet for transmission on a physical medium.

* * * * *